(12) United States Patent
Li et al.

(10) Patent No.: US 10,971,136 B2
(45) Date of Patent: Apr. 6, 2021

(54) METHOD AND APPARATUS FOR RANKING RESPONSES OF DIALOG MODEL, AND NON-TRANSITORY COMPUTER-READABLE RECORDING MEDIUM

(71) Applicants: Yihan Li, Beijing (CN); Yixuan Tong, Beijing (CN); Shanshan Jiang, Beijing (CN); Bin Dong, Beijing (CN)

(72) Inventors: Yihan Li, Beijing (CN); Yixuan Tong, Beijing (CN); Shanshan Jiang, Beijing (CN); Bin Dong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 16/218,693

(22) Filed: Dec. 13, 2018

(65) Prior Publication Data

US 2019/0198014 A1 Jun. 27, 2019

(30) Foreign Application Priority Data

Dec. 21, 2017 (CN) .......................... 201711395876.0

(51) Int. Cl.
*G10L 15/18* (2013.01)
*G06F 16/33* (2019.01)
(Continued)

(52) U.S. Cl.
CPC ...... *G10L 15/1815* (2013.01); *G06F 16/3347* (2019.01); *G06F 40/216* (2020.01); *G06F 40/30* (2020.01); *G06F 40/35* (2020.01); *G06F 40/56* (2020.01); *G10L 15/063* (2013.01); *G10L 15/14* (2013.01); *G10L 15/22* (2013.01)

(58) Field of Classification Search
None
See application file for complete search history.

(56) References Cited

U.S. PATENT DOCUMENTS

2010/0204982 A1* 8/2010 Weng .................... G10L 15/197
704/9
2010/0217592 A1* 8/2010 Gupta .................... G06F 40/35
704/236

(Continued)

OTHER PUBLICATIONS

C. Xing et al., "Topic Aware Neural Response Generation", Proceedings of the Thirty-First AAAI Conference on Artificial Intelligence, AAAI 17, pp. 3351-3357, 2017.

*Primary Examiner* — Jakieda R Jackson
(74) *Attorney, Agent, or Firm* — IPUSA, PLLC (57) ABSTRACT

A method and an apparatus for ranking responses of a dialog model, and a non-transitory computer-readable recording medium are provided. The dialog model is trained based on a sample data set. The method includes obtaining, from the sample data set, at least one similar dialog whose content is semantically similar to content of a target dialog; obtaining a probability of at least one target response generated by the dialog model when inputting the target dialog, and obtaining a probability of a target response generated by the dialog model when inputting the similar dialog; statistically analyzing, based on the probabilities of the respective generated target responses, scores of the target responses, the scores of the target responses being positively correlated with the probabilities of the target responses; and ranking the target responses in a descending order of the scores.

9 Claims, 5 Drawing Sheets (51) Int. Cl.
*G10L 15/14*    (2006.01)
*G10L 15/06*    (2013.01)
*G06F 40/30*    (2020.01)
*G06F 40/35*    (2020.01)
*G06F 40/56*    (2020.01)
*G06F 40/216*   (2020.01)
*G10L 15/22*    (2006.01)

(56)         References Cited

U.S. PATENT DOCUMENTS

| | | | |
|---|---|---|---|
| 2011/0040766 A1* | 2/2011 | Robinson | G06F 16/38 |
| | | | 707/749 |
| 2011/0078205 A1* | 3/2011 | Salkeld | G06F 16/3344 |
| | | | 707/794 |
| 2012/0226492 A1* | 9/2012 | Tsuboi | G06F 16/3344 |
| | | | 704/9 |
| 2012/0253825 A1* | 10/2012 | Di Fabbrizio | G06F 40/30 |
| | | | 704/275 |
| 2014/0295400 A1* | 10/2014 | Zapata-Rivera | G09B 5/06 |
| | | | 434/362 |
| 2014/0359656 A1* | 12/2014 | Banica | H04N 21/234 |
| | | | 725/32 |
| 2015/0356091 A1* | 12/2015 | Zhao | G06F 21/316 |
| | | | 707/728 |
| 2016/0055147 A1* | 2/2016 | Duan | G06F 40/30 |
| | | | 704/9 |
| 2017/0004387 A1* | 1/2017 | Tang | G06K 9/6215 |
| 2017/0118336 A1* | 4/2017 | Tapuhi | H04M 3/4938 |
| 2018/0083898 A1* | 3/2018 | Pham | G06F 40/274 |
| 2018/0218734 A1* | 8/2018 | Somech | G10L 15/005 |
| 2019/0114348 A1* | 4/2019 | Gao | H04L 9/0662 |
| 2019/0155905 A1* | 5/2019 | Bachrach | G06F 40/30 |

* cited by examiner

METHOD AND APPARATUS FOR RANKING RESPONSES OF DIALOG MODEL, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 201711395876.0 filed on Dec. 21, 2017, the entire contents of which are incorporated herein by reference.

BACKGROUND OF THE INVENTION

1. Field of the Invention

The present invention relates to the field of dialog processing, and specifically, a method and an apparatus for ranking responses of a dialog model, and a non-transitory computer-readable recording medium.

2. Description of the Related Art

Dialog generation is to automatically output a response whose content matches content of a dialog (such as one sentence or a short text including a plurality of sentences) for replying to the dialog given by a user. It is usually required that the content of the response is grammatically correct and is logically consistent with the content of the dialog of the user. Conventional technology of dialog generation includes a method based on a search-approach and a method based on a generation-approach.

Specifically, in a method based on a search-approach, a sentence is found as a response sentence (hereinafter also referred to as "response") from a database according to a certain metric standard. The response sentences given by such a method is usually grammatically correct, but there is a problem of poor extensibility and adaptability. In a method based on a generation-approach, a neural network dialog model is trained, and a sentence that meets requirements is automatically generated as a response based on the neural network dialog model. This method has good extensibility and adaptability, and can learn and understand content of a dialog given by a user and can reply corresponding response. There are still some problems in the current application, although the method based on a generation-approach has the above mentioned good performance.

Assuming that there is a trained neural network dialog model M, when a user gives a sentence P, the neural network dialog model M usually generates a plurality of sentences R with different ranks. The higher a sentence is ranked in R (the closer the rank of a sentence comes to the top in R), more likely the sentence is selected as a response sentence of P. Namely, sentences in R are ranked in a descending order of probabilities of selecting respective sentences as a response sentence of P. One goal of the method based on a generation-approach is to improve qualities of higher ranked response sentences. However, when training a neural network dialogue model, due to the uneven distribution of words in a training set, degrees of understanding of sentences composed of different words are different. Accordingly, a higher ranked sentence may be not suitable as a response sentence for replying to a user sentence P, and a sentence that is suitable as a response sentence for replying to a user sentence P may be ranked lower.

SUMMARY OF THE INVENTION

According to an aspect of the present invention, a method for ranking responses of a dialog model is provided. The dialog model is trained based on a sample data set. The method includes obtaining, from the sample data set, at least one similar dialog whose content is semantically similar to content of a target dialog; obtaining a probability of at least one target response generated by the dialog model when inputting the target dialog, and obtaining a probability of a target response generated by the dialog model when inputting the similar dialog; statistically analyzing, based on the probabilities of the respective generated target responses, scores of the target responses, the scores of the target responses being positively correlated with the probabilities of the target responses; and ranking the target responses in a descending order of the scores.

According to another aspect of the present invention, an apparatus for ranking responses of a dialog model is provided. The dialog model is trained based on a sample data set. The apparatus includes a memory storing computer-readable instructions; and one or more processors configured to execute the computer-readable instructions such that the one or more processors are configured to obtain, from the sample data set, at least one similar dialog whose content is semantically similar to content of a target dialog; obtain a probability of at least one target response generated by the dialog model when inputting the target dialog, and obtain a probability of a target response generated by the dialog model when inputting the similar dialog; statistically analyze, based on the probabilities of the respective generated target responses, scores of the target responses, the scores of the target responses being positively correlated with the probabilities of the target responses; and rank the target responses in a descending order of the scores.

According to another aspect of the present invention, a non-transitory computer-readable recording medium having computer-executable instructions for execution by a processing system is provided. The computer-executable instructions, when executed, cause the processing system to carry out a method for ranking responses of a dialog model. The dialog model is trained based on a sample data set. The method includes obtaining, from the sample data set, at least one similar dialog whose content is semantically similar to content of a target dialog; obtaining a probability of at least one target response generated by the dialog model when inputting the target dialog, and obtaining a probability of a target response generated by the dialog model when inputting the similar dialog; statistically analyzing, based on the probabilities of the respective generated target responses, scores of the target responses, the scores of the target responses being positively correlated with the probabilities of the target responses; and ranking the target responses in a descending order of the scores.

BRIEF DESCRIPTION OF THE DRAWINGS

The above and other objects, features and advantages of the present invention will be further clarified by describing in detail embodiments of the present invention in combination with the drawings.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, description of well-known functions and constructions is omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in time order, however the performing sequence is not limited to the time order. Any steps may be performed in parallel or independently.

As described in the background art, in responses generated by a conventional dialog model based on a neural network, a higher ranked response may be not suitable as a response for replying to a user's dialog. In view of the problem of the conventional technology, embodiments of the present invention have an object to provide a method and an apparatus for ranking responses of a dialog model, and a non-transitory computer-readable recording medium that can increase a rank of a response that is suitable for replying to a user's dialog by re-ranking a plurality of responses generated by the dialog model and can improve a response quality of the dialog model based on a neural network.

In the method for ranking responses of a dialog model according to an embodiment of the present invention, responses generated by a dialog model based on a neural network may be re-ranked. Here, the dialog model is usually obtained by performing training based on a pre-acquired sample data set, for example, assuming that a sample corpus is represented as $D=\{X_i, Y_i\}_1^w$, where $X_i$ represents a sample dialog, $Y_i$ represents a sample response for replying to the sample dialog, a value of i is within 1 to 10, and w represents the number of sample pairs $(X_i, Y_i)$. A dialog model of a neural network is trained using the sample corpus, and the dialog model can generate candidate responses and their probabilities with respect to dialog $P_q$ given by a user. The candidate responses are ranked in a descending order of scores calculated by the dialog model, and for example, the scores of the candidate responses may be the probabilities of the candidate responses. In general, the higher a score of a candidate response is, more likely the candidate response is selected as a response of $P_q$.

Figure 1:
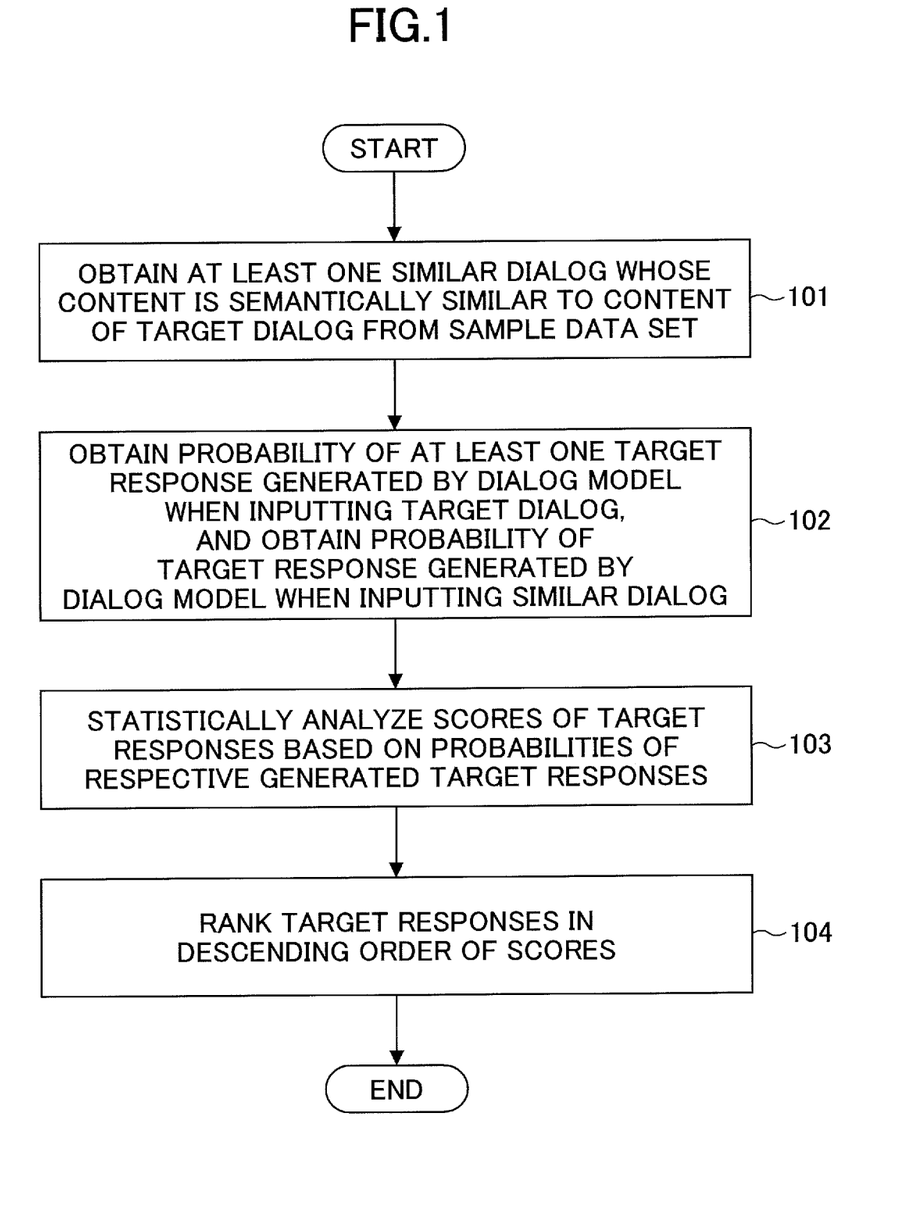
FIG. 1 is a flowchart illustrating a response ranking method of a dialog model according to an embodiment of the present invention.

An embodiment of the present provides a response ranking method of a dialog model. As shown in FIG. 1, the response ranking method includes steps 101 to 104.

Step 101: obtain at least one similar dialog whose content is semantically similar to content of a target dialog from the sample data set.

Figure 5:
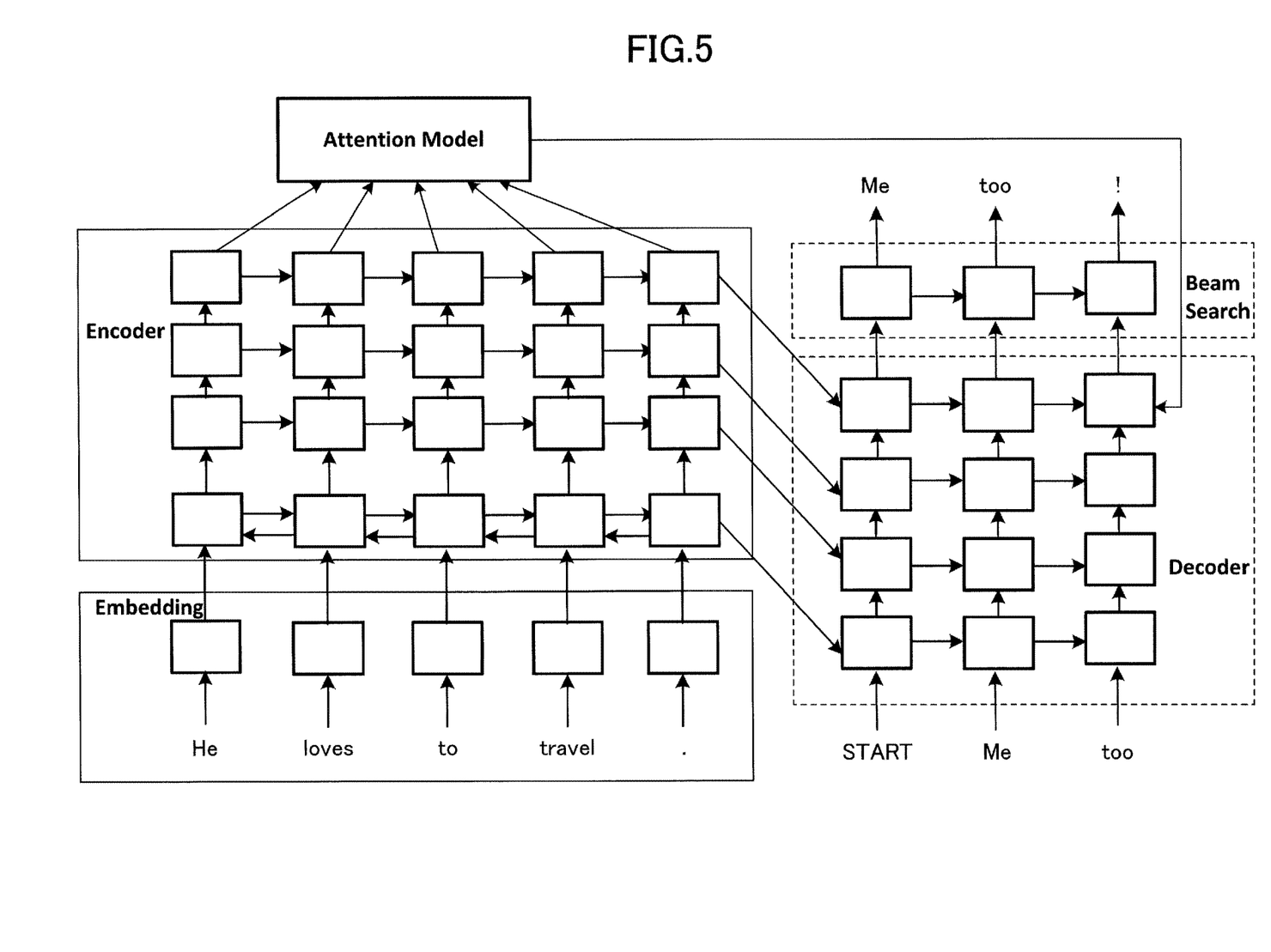
FIG. 5 is a block diagram illustrating a configuration of a Seq2Seq model used in an embodiment of the present invention.

Here, before step 101, the dialog model M based on a neural network may be trained using the sample data set based on a sequence-to-sequence (Seq2Seq) model. FIG. 5 is a block diagram illustrating a configuration of a Seq2Seq model used in an embodiment of the present invention, which generally includes the following units.

Embedding: mapping words to vectors;

Encoder: converts a sentence into a vector list representing a semantic vector of a currently processed sentence;

Attention Model: allows the decoder to focus on different parts of an input sentence when decoding (decoder);

Decoder: calculate a probability of generating a next word, based on the attention and a last generated word;

Beam Search: generates a plurality of responses and generates respective probabilities of the responses.

The above Seq2Seq model is merely an example of a model according to the embodiments of the present invention, and the present invention is not limited to this example.

In step 101, the target dialog content may be a dialog content input by a user. In the embodiment of the present invention, in order to improve response qualities of responses (namely target responses) for replying to the target dialog, in step 101, at least one similar dialog whose content is semantically similar to the content of the target dialog are selected from the sample data set. Specifically, a first number of the similar dialogs may be preset, and the first number of similar dialogs may be selected in a descending order of semantic similarities. Alternatively, a threshold of a semantic similarity may be set, and similar dialogs whose semantic similarity is greater than or equal to the threshold may be selected.

The embodiment of the present invention may adopt but is not limited to the following method for obtaining the semantic similarity. Word vectors are trained based on a previously selected corpus (for example a previously selected Wikipedia Chinese corpus in a case of a Chinese dialog); semantic vector of content of the target dialog and semantic vectors of content of one or more sample dialogs in the sample data set are calculated based on the word vectors; semantic similarities between the target dialog and the respective sample dialogs are calculated based on the semantic vectors; and the at least one similar dialog is selected in a descending order of the semantic similarities.

For example, the word vectors of words may be obtained by performing training using a word2vec method based on a Wikipedia Chinese corpus. The word vector represents a vector representation of the semantics of the word. Assuming that the trained word vector is represented as WE, for any word w, its word vector may be represented as WE(w).

Next, a semantic vector of a sentence is calculated based on word vectors. Assuming that a sentence is S, which can be expressed as a combination of words $<w_{s1}, w_{s2}, \ldots w_{sn}>$ by word segmentation processing, where $W_{si}$ represents the i-th word in sentence S. Then the semantic vector SE(S) of the sentence S may be expressed as the following formula.

$$SE(S) = \sum_{i=1}^{n} WE(w_{si})$$

In the above formula, n represents the number of words in the sentence S.

A cosine of an included angle between vectors may be calculated as a metric of a semantic similarity based on the semantic vectors of two sentences. For example, a semantic similarity $SS(S_i, S_j)$ of sentences Si and Sj may be calculated as follows.

$$SS(S_i, S_j) = \frac{SE(S_i)SE(S_j)}{|SE(S_i)||SE(S_j)|}$$

In the above formula, the numerator $SE(S_i)SE(S_j)$ represents an inner product of semantic vector SE ($S_i$) of sentence $S_i$ and semantic vector $SE(S_j)$ of the sentence $S_j$, and $|SE(S_i)|$ and $|SE(S_j)|$ represent lengths of semantic vectors $SE(S_i)$ and $SE(S_j)$, respectively.

In the above formula, the similarity of the vectors is calculated based on the cosine of the included angle between the vectors; however, the embodiment of the present invention may also another method, for example calculating the similarity based on an Euclidean distance of the vectors, and the detailed description is omitted here.

In the embodiment of the present invention, when the user gives a target dialog $P_q$, top N sentences (in a descending order of the semantic similarities) whose content is semantically similar to content of $P_q$ may be found as similar dialogs SP from a sample corpus D. Here, N is an integer greater than or equal to 1.

Step 102: obtain a probability of at least one target response generated by the dialog model when inputting the target dialog, and obtain a probability of a target response generated by the dialog model when inputting the similar dialog.

Here, target dialog content $P_q$ is input into the dialog model, and at least one target response generated by the dialog model and its probability are obtained. The probability means a probability of selecting the target response as a response for replying to the target dialog. A response set constituted of the at least one target response is expressed as PR. For each target response $r_i$ in PR, when a sentence $P_s$ in similar dialog SP is input into the dialog model M, a probability of generating target response $r_i$ by the dialog model M may be expressed as follows.

$$Proba(r_i|P_s) = M(r_i|P_s)$$

Here, M(*) represents a generation probability calculated by dialog model M.

Step 103: statistically analyze scores of the target responses based on the probabilities of the respective generated target responses. Here, the scores of the target responses are positively correlated with the probabilities of the target responses.

In step 102, the probabilities of the target responses generated by the dialog model are obtained by inputting the target dialog and the similar dialog into the dialog model, respectively. In step 103, for each target response, the probabilities of generating the target response are accumulated, and the score of the target response is obtained. Specifically, the probabilities of the same target response may be directly added up to obtain the score of the target response. Alternatively, a sum of products of the probabilities of the same target response and respective weights (namely a weighted sum) may be calculated to obtain the score of the target response. It can be seen that the score of the target response is positively correlated with the probability of generating the target response.

When calculating the weighted sum, the embodiment of the present invention may calculate the score of the target response by using the following formula. For example, for each response sentence $r_j$ in PR, score Rank($r_j$) may be calculated as follows.

$$Rank(r_j) = \sum_{i=0}^{i=n} \gamma_i \cdot Proba(r_j | p_i), \text{ where } p_i \in SP \cup P_q$$

In the above formula, n represents the number of dialog contents in set $SP \cup P_q$, and parameter $\gamma_i$ represents a contribution degree (a weight) of each $p_i$ in the score. Here, $\Sigma_{i=0}^{n} \gamma_i = 1$ may also be set to normalize the weights.

Step 102: rank the target responses in a descending order of the scores.

Here, the ranking of target responses output by the dialog model is adjusted in the descending order of the scores calculated in step S103, thereby adjusting the ranking (the order) of the target responses output by the dialog model. The dialog model may select one final response as a response for replying to the target dialog, based on the re-ranked target responses. In general, the higher a target response is ranked, more likely the target response is selected. Of course, the top-ranked one target response may be directly selected as the final response.

From above, in the embodiment of the present invention, when adjusting the ranking (the order) of the target responses, one or more similar dialogs whose content is semantically similar to the content of the target dialog are also taken into consideration. If a certain target response is also generated based on a similar dialog, it means that logical consistency between the content of the target response and the content of the target dialog is relatively high. Based on the above principle, the probabilities of generating the same target response under the target dialog and the similar dialog are statistically analyzed as the scores for ranking the target responses. By this way, it is possible to effectively increase a rank of a sentence that is suitable for replying to target dialog P, accordingly it is possible to improve a response quality of the dialog model.

An example is as follows.

P1: Insomnia is a book that cannot be read off.

P2: I suffered from insomnia last night.

CR: A cup of milk before going to bed can help a person sleep.

P1 and P2 are two sentences, and CR is a response of P1. It can be seen that both P1 and P2 are talking about the subject of insomnia, which can be considered as semantically similar sentences. Therefore, response CR that is suitable for P1 is also suitable for P2. Based on the above principle, if a sentence that is suitable as a response sentence for replying to sentence P is ranked lower, one or more similar sentences of sentence P may be obtained, and a probability of generating a response sentence may be calculated based on the one or more similar sentences. Because the probability of generating the response sentence by the similar sentences may be high, the rank of the appropriate response sentence can be increased by re-ranking based on the probabilities; accordingly, the embodiment of the present invention can improve the quality of the reply.

According to the response ranking method of the embodiment of the present invention, the probabilities of generating the same target response under the target dialog and the similar dialog are statistically analyzed as the scores for ranking the target responses. By this way, it is possible to effectively increase a rank of a response content that is suitable for replying to a user dialog by re-ranking a plurality of responses generated by the dialog model, accordingly it is possible to improve a response quality of the dialog model based on a neural network.

An embodiment of the present invention further provides a non-transitory computer-readable recording medium having computer-executable instructions for execution by a processing system. When the computer-executable instructions are executed, the computer-executable instructions cause the processing system to carry out the above response ranking method.

Figure 2:
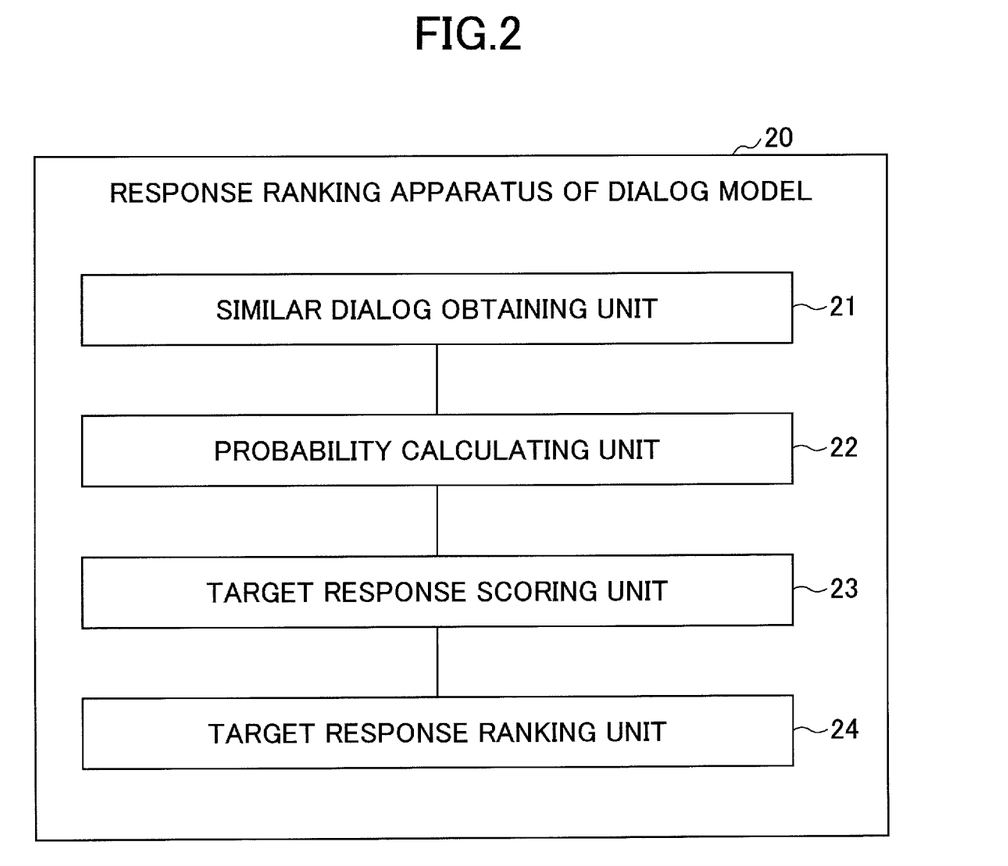
FIG. 2 is a block diagram illustrating a configuration of a response ranking apparatus of a dialog model according to an embodiment of the present invention.

An embodiment of the present provides a response ranking apparatus 20 of a dialog model. As shown in FIG. 2, the response ranking apparatus 20 includes a similar dialog obtaining unit 21, a probability calculating unit 22, a target response scoring unit 23, and a target response ranking unit 24. The dialog model is trained based on a sample data set.

The similar dialog obtaining unit 21 obtains at least one similar dialog whose content is semantically similar to content of a target dialog from the sample data set.

The probability calculating unit 22 obtains a probability of at least one target response generated by the dialog model when inputting the target dialog content, and obtains a probability of a target response generated by the dialog model when inputting the similar dialog.

The target response scoring unit 23 statistically analyzes scores of the target responses based on the probabilities of the respective generated target responses. The scores of the target responses are positively correlated with the probabilities of the target responses.

The target response ranking unit 24 ranks the target responses in a descending order of the scores.

Figure 3:
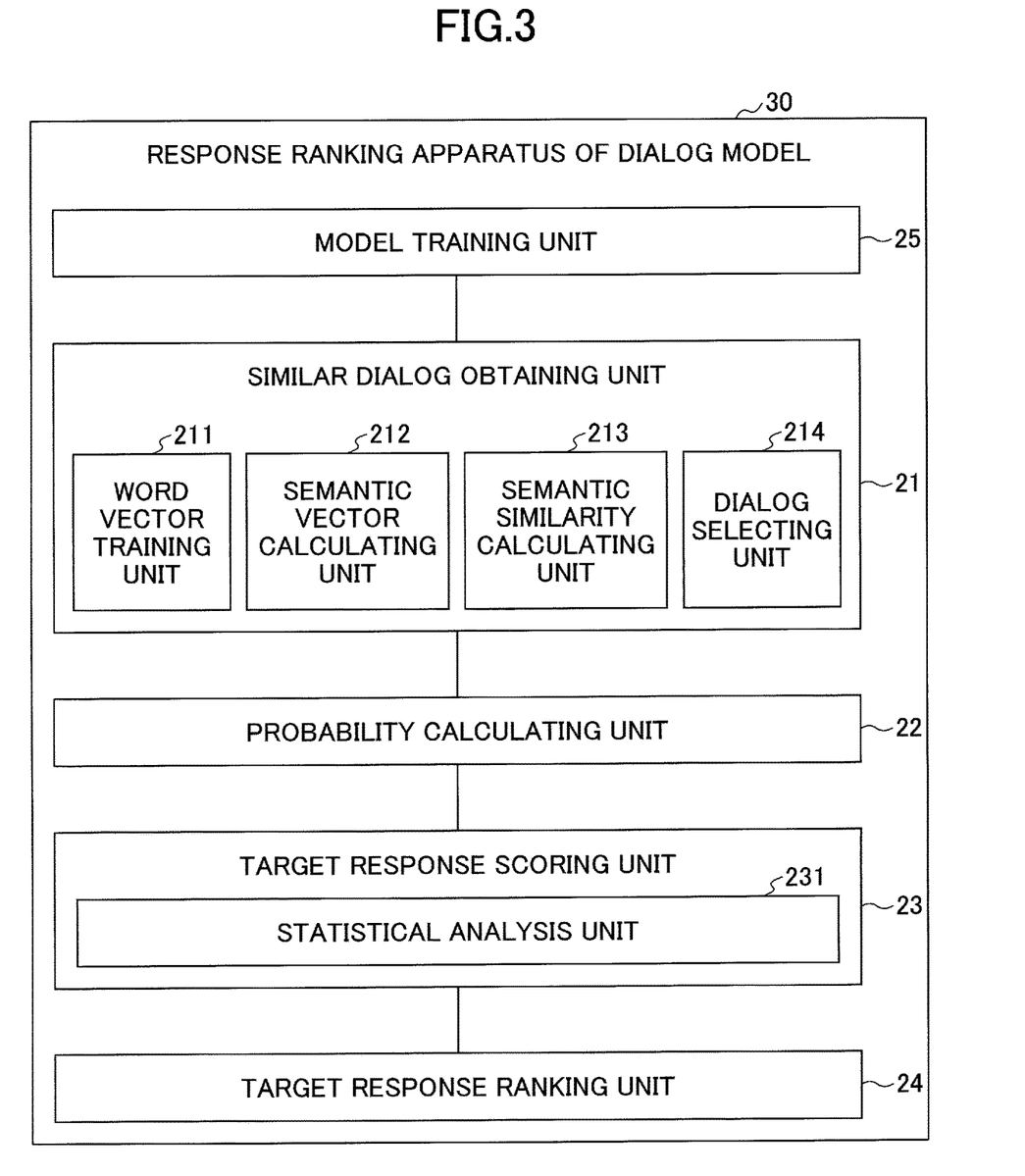
FIG. 3 is a block diagram illustrating a configuration of a response ranking apparatus of a dialog model according to another embodiment of the present invention.

FIG. 3 is a block diagram illustrating a configuration of a response ranking apparatus 30 of a dialog model according to another embodiment of the present invention. As shown in FIG. 3, the similar dialog obtaining unit 21 includes a word vector training unit 211, a semantic vector calculating unit 212, a semantic similarity calculating unit 213, and a dialog selecting unit 214.

The word vector training unit 211 trains word vectors based on a previously selected corpus.

The semantic vector calculating unit 212 calculates semantic vector of the content of the target dialog and semantic vectors of content of one or more sample dialogs in the sample data set based on the word vectors.

The semantic similarity calculating unit 213 calculates semantic similarities between the target dialog and the respective sample dialogs based on the semantic vectors.

The dialog selecting unit 214 selects the at least one similar dialog in a descending order of the semantic similarities.

Preferably, the response ranking apparatus 30 further includes a model training unit 25.

The model training unit 25 trains the dialog model using the sample data set based on a sequence-to-sequence model.

Preferably, the target response scoring unit includes a statistical analysis unit 231. The statistical analysis unit 231 calculates a sum of products of the probabilities of the generated target responses and respective weights to obtain the scores of the target responses.

Figure 4:
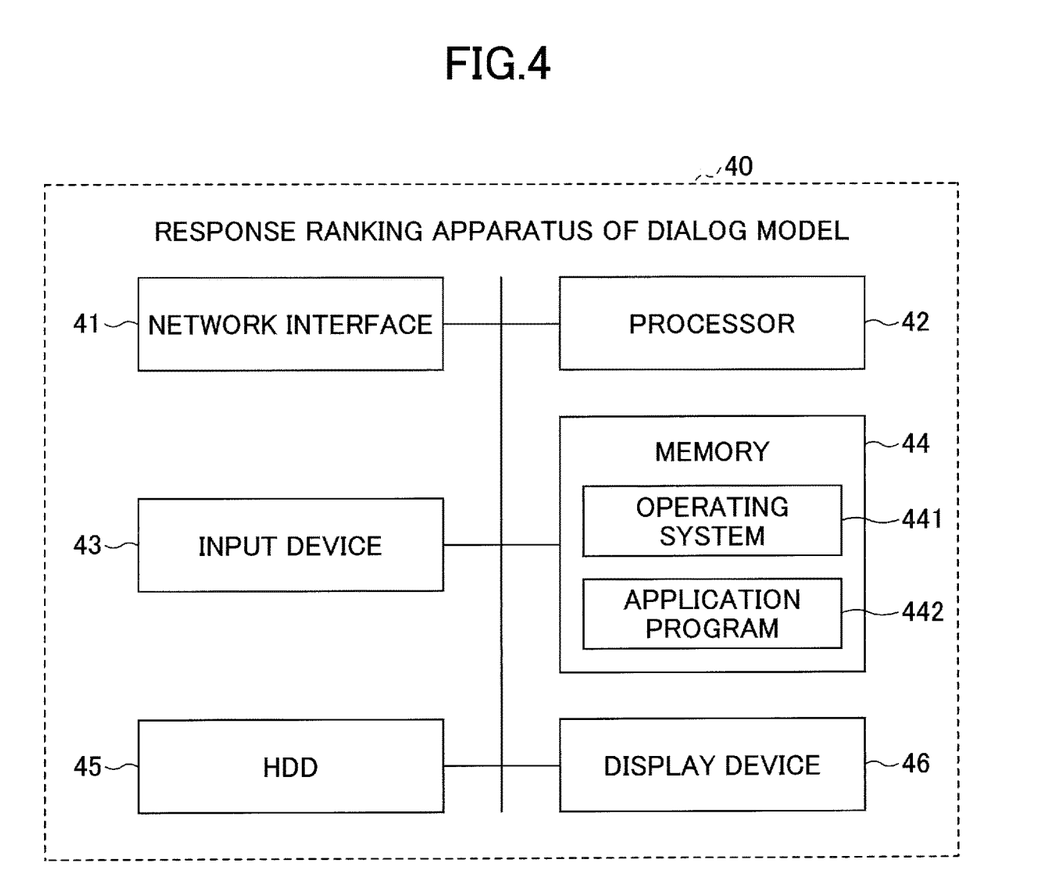
FIG. 4 is a block diagram illustrating a configuration of a response ranking apparatus of a dialog model according to another embodiment of the present invention.

An embodiment of the present further provides a response ranking apparatus 40 of a dialog model. FIG. 4 is a block diagram illustrating a configuration of a response ranking apparatus of a dialog model according to another embodiment of the present invention. A system receives target responses provided by the dialog model, performs re-ranking, and output a final ranking result. As shown in FIG. 4, the response ranking apparatus 40 includes a processor 42, and a memory 44 storing computer-readable instructions.

When the computer-readable instructions are executed by the processor 42, the processor 42 obtains at least one similar dialog whose content is semantically similar to content of a target dialog from the sample data set; obtains a probability of at least one target response generated by the dialog model when inputting the target dialog, and obtains a probability of a target response generated by the dialog model when inputting the similar dialog; statistically analyzes scores of the target responses, based on the probabilities of the respective generated target responses, the scores of the target responses being positively correlated with the probabilities of the target responses; and ranks the target responses in a descending order of the scores.

As illustrated in FIG. 4, the response ranking apparatus 40 further includes a network interface 41, an input device 43, a hard disk drive (HDD) 45, and a display device 46.

Each of ports and each of devices may be connected to each other via a bus architecture. The processor 42 such as one or more central processing units (CPUs), and the memory 44 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 41 may be connected to a network (such as the Internet, a LAN or the like), receive information from the network, and store the received information in the hard disk drive 45.

The input device 43 may receive various commands such as predetermined threshold and its setting information input by a user, and transmit the commands to the processor 42 to be executed. The input device 43 may include a keyboard, a click apparatus (such as a mouse or a track ball), a touch board, a touch panel or the like.

The display device 46 may display a result obtained by executing the commands, for example a final recognition result after processing.

The memory 44 stores programs and data required for running an operating system, and data such as intermediate results in calculation processes of the processor 42.

Note that the memory 44 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 44 of the apparatus or the method described herein includes and is not limited to any other suitable memory.

In some embodiments, the memory 44 stores executable modules or data structure, their subsets, or their superset, i.e., an operating system (OS) 441 and an application program 442.

The operating system 441 includes various system programs for realizing various essential tasks and processing tasks based on hardware, such as a frame layer, a core library layer, a drive layer and the like. The application program 442 includes various application programs for realizing various application tasks, such as a browser and the like. A program for realizing the method according to the embodiments of the present invention may be included in the application program 442.

The method according to the above embodiments of the present invention may be applied to the processor 42 or may be realized by the processor 42. The processor 42 may be an integrated circuit chip capable of processing signals. Each step of the above method may be realized by instructions in a form of integrated logic circuit of hardware in the processor 42 or a form of software. The processor 42 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, and alternatively, the processor may be any common processors. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 44, and the processor 42 reads information in the memory 44 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, when the computer-readable instructions are executed by the processor 42, the processor 42 may train word vectors based on a previously selected corpus; calculate semantic vector of the content of the target dialog and semantic vectors of content of one or more sample dialogs in the sample data set based on the word vectors; calculate semantic similarities between the target dialog and the respective sample dialogs based on the semantic vectors; and select the at least one similar dialog in a descending order of the semantic similarities.

Specifically, when the computer-readable instructions are executed by the processor 42, the processor 42 may train the dialog model using the sample data set based on a sequence-to-sequence model.

Specifically, when the computer-readable instructions are executed by the processor 42, the processor 42 may calculate a sum of products of the probabilities of the generated target responses and respective weights to obtain the scores of the target responses.

As known by a person skilled in the art, the elements and algorithm steps of the embodiments disclosed herein may be implemented by electronic hardware or a combination of computer software and electronic hardware. Whether these functions are performed in hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, may be located in one place, or may be distributed to network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically disclosed embodiments, and various modifications, combinations and replacements may be made without departing from the scope of the present invention.

What is claimed is:

1. A method for ranking responses of a dialog model, the dialog model being trained based on a sample data set, the method comprising:
obtaining, from the sample data set, at least one similar dialog whose content is semantically similar to content of a target dialog;
obtaining a probability of at least one target response generated by the dialog model when inputting the target dialog, and obtaining a probability of a target response generated by the dialog model when inputting the similar dialog;
statistically analyzing, based on the probabilities of the respective generated target responses, scores of the target responses, the scores of the target responses being positively correlated with the probabilities of the target responses,
wherein the probabilities of the respective generated target responses $r_i$ are calculated as $$\text{Proba}(r_i|P_s) = M(r_i|P_s),$$

wherein the $r_i$ is each target response in a response set including the at least one target response and the $P_s$ is a sentence to be input into a dialog model M,
wherein the scores are calculated using the following formula:

$$\text{Rank}(r_j) = \sum_{i=0}^{i=n} \gamma_i \cdot \text{Proba}(r_j | p_i), \text{ where } p_i \in SP \cup P_q,$$

wherein, the n represents the number of dialog contents in set $SP \cup P_q$, and parameter $\gamma_i$ represents a weight of each $p_i$ in the score; and
ranking the target responses in a descending order of the scores, and
wherein the method further comprising:
training the dialog model using the sample data set based on a sequence-to-sequence model, before obtaining the at least one similar dialog whose content is semantically similar to the content of the target dialog from the sample data set.

2. The method for ranking responses according to claim 1, wherein obtaining the at least one similar dialog whose content is semantically similar to the content of the target dialog from the sample data set includes
training, based on a previously selected corpus, word vectors;
calculating, based on the word vectors, semantic vector of the content of the target dialog and semantic vectors of content of one or more sample dialogs in the sample data set;
calculating, based on the semantic vectors, semantic similarities between the target dialog and the respective sample dialogs; and
selecting the at least one similar dialog in a descending order of the semantic similarities.

3. The method for ranking responses according to claim 1, wherein statistically analyzing the scores of the target responses based on the probabilities of the respective generated target responses includes
calculating a sum of products of the probabilities of the generated target responses and respective weights to obtain the scores of the target responses.

4. An apparatus for ranking responses of a dialog model, the dialog model being trained based on a sample data set, the apparatus comprising:
a memory storing computer-readable instructions; and
one or more processors configured to execute the computer-readable instructions such that the one or more processors are configured to
obtain, from the sample data set, at least one similar dialog whose content is semantically similar to content of a target dialog;
obtain a probability of at least one target response generated by the dialog model when inputting the target dialog, and obtain a probability of a target response generated by the dialog model when inputting the similar dialog;
statistically analyze, based on the probabilities of the respective generated target responses, scores of the target responses, the scores of the target responses being positively correlated with the probabilities of the target responses,
wherein the probabilities of the respective generated target responses $r_i$ are calculated as $$\text{Proba}(r_i|P_s) = M(r_i|P_s),$$

wherein the $r_i$ is each target response in a response set including the at least one target response and the $P_s$ is a sentence to be input into a dialog model M,
wherein the scores are calculated using the following formula:

$$\text{Rank}(r_j) = \sum_{i=0}^{i=n} \gamma_i \cdot \text{Proba}(r_j | p_i), \text{ where } p_i \in SP \cup P_q,$$

wherein, the n represents the number of dialog contents in set $SP \cup P_q$, and parameter $\gamma_i$ represents a weight of each $p_i$ in the score; and
rank the target responses in a descending order of the scores, and
wherein the one or more processors are further configured to train the dialog model using the sample data set based on a sequence-to-sequence model.

5. The apparatus for ranking responses according to claim 4,
wherein the one or more processors are configured to
train, based on a previously selected corpus, word vectors;
calculate, based on the word vectors, semantic vector of the content of the target dialog and semantic vectors of content of one or more sample dialogs in the sample data set;
calculate, based on the semantic vectors, semantic similarities between the target dialog and the respective sample dialogs; and
select the at least one similar dialog in a descending order of the semantic similarities.

6. The apparatus for ranking responses of a dialog model according to claim 4,
wherein the one or more processors are configured to
calculate a sum of products of the probabilities of the generated target responses and respective weights to obtain the scores of the target responses.

7. A non-transitory computer-readable recording medium having computer-executable instructions for execution by a processing system, wherein, the computer-executable instructions, when executed, cause the processing system to carry out a method for ranking responses of a dialog model, the dialog model being trained based on a sample data set, the method comprising:

obtaining, from the sample data set, at least one similar dialog whose content is semantically similar to content of a target dialog;

obtaining a probability of at least one target response generated by the dialog model when inputting the target dialog, and obtaining a probability of a target response generated by the dialog model when inputting the similar dialog;

statistically analyzing, based on the probabilities of the respective generated target responses, scores of the target responses, the scores of the target responses being positively correlated with the probabilities of the target responses, wherein the probabilities of the respective generated target responses $r_i$ are calculated as $Proba(r_i|P_s) = M(r_i|P_s)$, wherein the $r_i$ is each target response in a response set including the at least one target response and the $P_s$ is a sentence to be input into a dialog model M, wherein the scores are calculated using the following formula:

$$Rank(r_j) = \sum_{i=0}^{i=n} \gamma_i \cdot Proba(r_j | p_i), \text{ where } p_i \in SP \cup P_q,$$

wherein, the n represents the number of dialog contents in set $SP \cup P_q$ and parameter $\gamma_i$ represents a weight of each $p_i$ in the score; and ranking the target responses in a descending order of the scores, wherein the method further comprising:

training the dialog model using the sample data set based on a sequence-to-sequence model, before obtaining the at least one similar dialog whose content is semantically similar to the content of the target dialog from the sample data set.

8. The non-transitory computer-readable recording medium according to claim 7, wherein obtaining the at least one similar dialog whose content is semantically similar to the content of the target dialog from the sample data set includes training, based on a previously selected corpus, word vectors;

calculating, based on the word vectors, semantic vector of the content of the target dialog and semantic vectors of content of one or more sample dialogs in the sample data set;

calculating, based on the semantic vectors, semantic similarities between the target dialog and the respective sample dialogs; and selecting the at least one similar dialog in a descending order of the semantic similarities.

9. The non-transitory computer-readable recording medium according to claim 7, wherein statistically analyzing the scores of the target responses based on the probabilities of the respective generated target responses includes calculating a sum of products of the probabilities of the generated target responses and respective weights to obtain the scores of the target responses.

* * * * *